United States Patent [19]
Geyer, Jr.

[11] 3,733,941
[45] May 22, 1973

[54] APPARATUS FOR CUTTING USED PNEUMATIC TIRE CASING

[76] Inventor: William J. Geyer, Jr., 172 Main St., Hellertown, Pa. 18055

[22] Filed: Jan. 3, 1972

[21] Appl. No.: 214,856

[52] U.S. Cl. ..................82/59, 82/70.2, 82/101, 157/13
[51] Int. Cl. ..............................B23b 5/14
[58] Field of Search.................82/46, 53, 59, 60, 82/70.2, 101, 4 E; 157/13

[56] References Cited

UNITED STATES PATENTS 3,364,526  1/1968  Varady et al. ..............157/13 X
3,701,296  10/1972  Snow ........................82/101 X Primary Examiner—Leonidas Vlachos
Attorney—Michael J. Delaney

[57] ABSTRACT

A used pneumatic tire casing is fixedly supported from within and about a rotatable shaft. A cutter drive bar is attached to and rotates with the shaft. Cutters are attached to the cutter drive bar. With the tire casing so supported and the cutters moved to pierce the tire casing, the shaft is rotated. The cutter drive bar and cutters rotate with the shaft, sweep through 360° and cut the tire casing into a number of circular portions.

8 Claims, 8 Drawing Figures

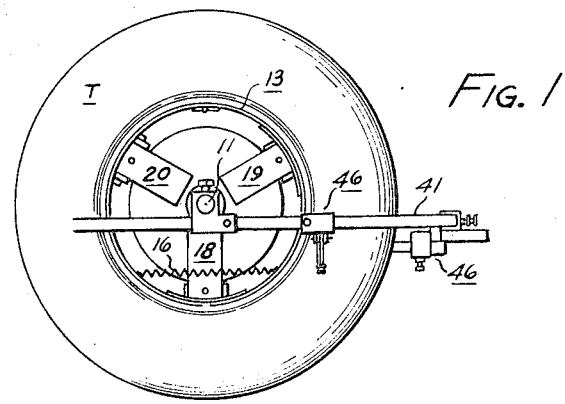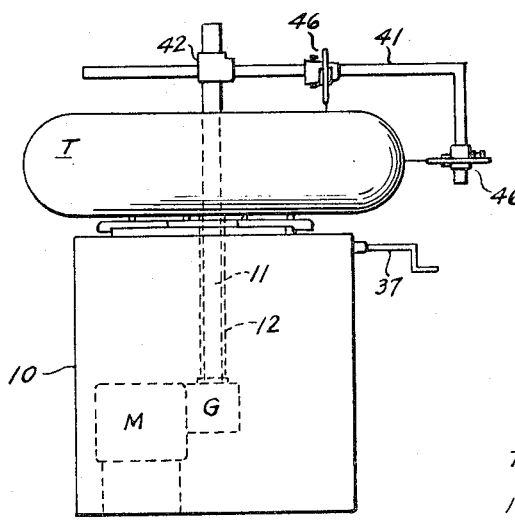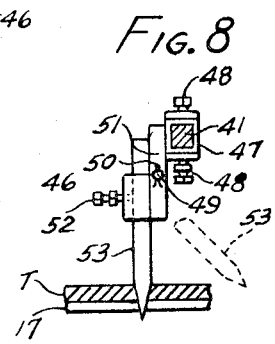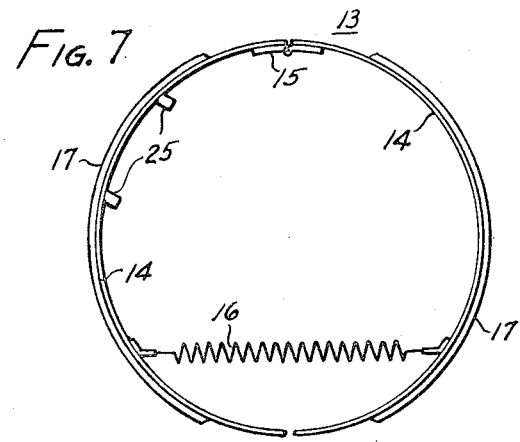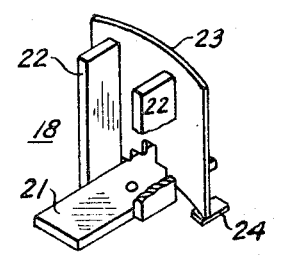

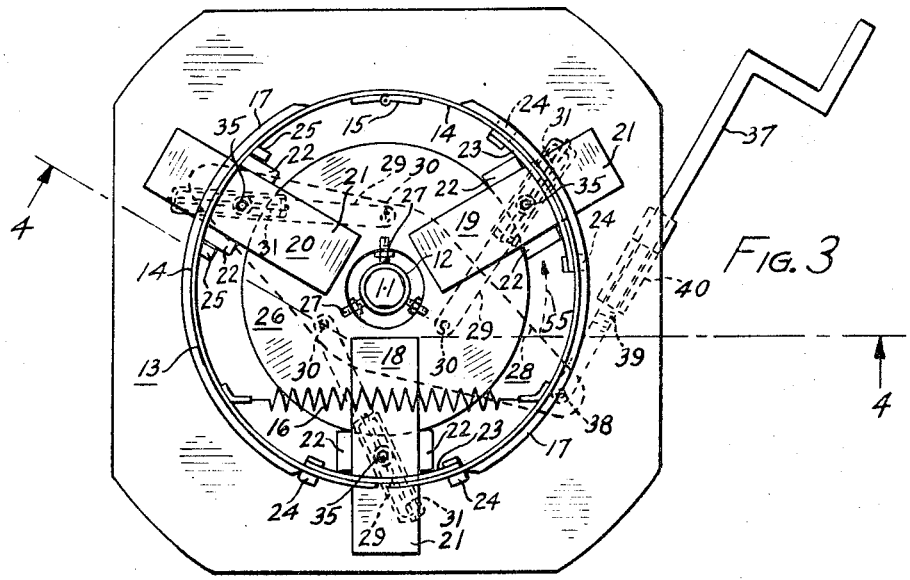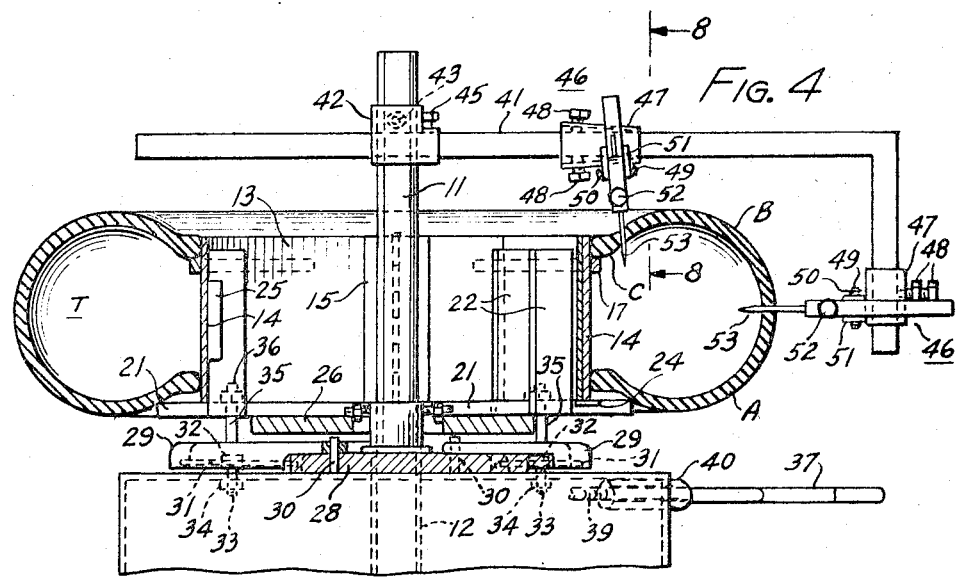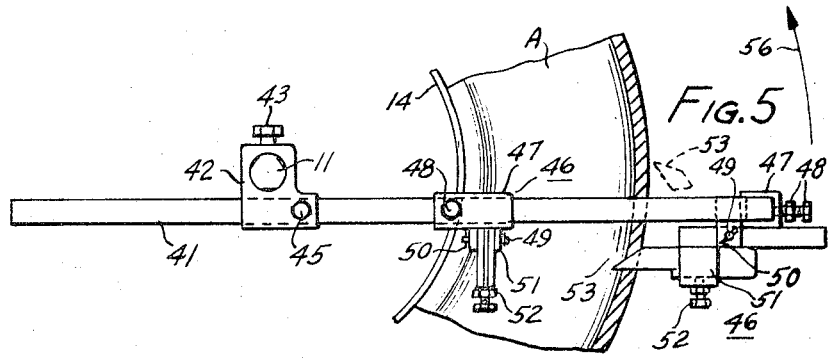

APPARATUS FOR CUTTING USED PNEUMATIC TIRE CASING

BACKGROUND OF THE INVENTION

Present day concern with ecology has shown that many used products should be treated in some manner so that they may be efficiently and economically disposed of or placed in a condition suitable for reuse. Such a product is a used pneumatic tire casing. Due to the bulk and shape of a tire casing, some disposal operation, e.g., sanitary land fill, refuse to accept tire casing for disposal or, in the alternative, require payment of a premium rate for their diaposal. Furthermore, while used rubber particles are widely used in industry for various purposes, the used tire casing must be cut into a number of portions to efficiently and economically shred the casing and separate the rubber from other components of the casing, e.g., textile and metal.

Prior art apparatus for cutting used tire casings is costly to operate. In addition, the initial cost of such apparatus is high. As a result, all parts of the country, including lakes, streams, rivers, cities and countrysides, are littered with used tire casing. One of the reasons for the high cost of the prior art apparatus is that the apparatus was designed solely for cutting tire casings and, as such, have no other use. In addition, the prior art apparatus included expensive machinery to rotate the tire casing during a cutting operation.

SUMMARY OF THE INVENTION

It is an object of this invention to provide an efficient and economical apparatus for cutting used tire casings prior to their disposal or their preparation for reuse.

It is another object of this invention to provide an apparatus to cut used tire casings which apparatus can be used in combination with apparatus commonly used to mount or demount tire casing from wheels.

The above objects are attained by fixedly supporting a tire casing from within and about a rotatable shaft having a cutter drive bar fixed thereto. Cutters are attached to the cutter drive bar and adapted to pierce the tire casing. By rotating the shaft after the cutters pierce the tire casing, the cutter drive bar and cutters sweep through 360° and cut the tire casing into a number of circular portions.

BRIEF DESCRIPTION OF THE DRAWINGS.

FIG. 1 is a top view of the apparatus of this invention.
FIG. 2 is an elevation view of the apparatus.
FIG. 3 is a more detailed top view of the apparatus with certain parts removed for clarity.
FIG. 4 is a view taken on the line 4—4 of FIG. 3 and, in addition, showing the cutting means.
FIG. 5 is a detailed top view of the cutting means.
FIG. 6 is a perspective view of part of the means to support the tire casing.
FIG. 7 is a top view of another part of the means to support the tire casing.
FIG. 8 is a view taken on the line 8—8 of FIG. 4.

DETAILED DESCRIPTION OF THE DRAWINGS

As shown in FIG. 1 and 2, this invention comprises in part apparatus commonly used for mounting a tire casing T on a wheel comprising a shaft 11 rotated by a motot M through a proper gear reducer G. Motor M and gear reducer G are secured to a base 10, while shaft 11 extends upwardly through stationary tube 12 and terminates above base 10.

This invention provides means for fixedly supporting the tire casing T from within and about the shaft 11. This means, as best shown in FIGS. 3 and 7, includes a drum 13 comprising two semi-circular segments 14,14 held together by hinge 15 and tension spring 16. Thus drum 13 is able to expand by segments 14 pivoting about hinge 15. Attached to each outer surface of segments 14 is a flange 17. The function of this flange 17 will be apparent hereinafter. In contact with the inner surface of drum 13 are three radially movable, equally spaced shoes 18, 19 and 20, as shown in FIG. 3. Each shoe comprises a base portion 21 and pair of integral upstanding portions 22. In addition, as shown in FIGS. 3 and 6, shoes 18 and 19 include an arcuate plate 23 secured to upstanding portions 22 for contacting the inner surface of the drum 13. Support plates 24 for supporting drum 13 are attached to arcuate plate 23. The upstanding portions 22 of shoe 20, which does not have an arcuate plate 23, are positioned between lugs 25 fixed to the inner surface of the drum 13 and are used to properly align drum 13 relative to shoes 18, 19 and 20. Shoes 18, 19 and 20 rest on plate 26 which is fixed to tube 12 by bolts 27.

Referring to FIGS. 3 and 4, shoes 18, 19 and 20 are movable radially into and out of engagement with drum 13 which in turn expands within tire casing T to fixedly support the tire casing T about shaft 11. To so move shoes 18, 19 and 20, a diamond shaped member 28 is rotatably mounted about tube 12. Three links 29 are pivotally attached to diamond shaped member 28 by pins 30. As best shown in FIG. 4, the outer end of each link 29 includes a horizontally extending guide rod 31 which passes through a hole in a block 32. Each block 32 is rotatably attached to the top of base 10 by means of threaded stud 33 and nut 34. The base portion 21 of each shoe 18, 19 and 20 is rotatably attached to a link 29 by means of stud 35 and nut 36. As best shown in FIG. 3, diamond shaped member 28 is pivotally attached to the end of crank 37 by a pin 38. Crank 37 includes an intermediate threaded portion 39 which is in threaded engagement with a sleeve 40 pivotally attached to base 10 in the usual manner.

Referring to FIGS. 4 and 5, an L-shaped cutter drive bar 41 is attached to the substantially square upper end of shaft 11 by a cutter bar mounting collar 42 which fits over the upper end of shaft 11 and is held in place by means of set screw 43. One leg of L-shaped cutter drive bar 41 passes through a horizontally extending opening in collar 42 and is adjustably secured thereto by set screw 45.

Adjustably secured to each leg of L-shaped cutter drive bar 41 is a cutter assembly. The cutter assembly 46 which is secured to the horizontally extending leg of cutter drive bar 41 is used to cut the casing T adjacent its bead, while the cutter assembly 46 which is secured to the vertically extending leg of L-shaped cutter bar 41 is used to cut through the tread of casing T. Each assembly 46 is substantially the same except for the differences hereinafter noted. The assemblies 46 comprise a collar 47 slidably mounted on cutter drive bar 41 and adjustably secured thereto by set screws 48. The collar 47 for the cutter assembly 46 which cuts the casing T adjacent is bead has a tapered hole therein to allow for variation in the angle its cutter makes with a horizontal plane, i.e., the cutting angle between the tire casing T and the cutter. This variation is accomplished by adjusting set screws 48. Pivotally attached to each collar 47 of each cutter assembly 46 by means of pin 49 and cotter pin 50 is a cutter holder 51. Firmly and removably attached to each cutter holder 51 by means of set screw 52 is a cutter 53.

The above means to vary the cutting angle between the cutter 53 and the tire casing T is of particular importance when a wide range of tire casings having side walls of widely varying configurations are to be cut on the apparatus of this invention. By providing for such variation in the cutting angle, tire casings can be efficiently cut with a minimum of power being supplied by motor M.

In operation, a tire casing T is placed about drum 13 with the inside surface of the upper bead of the tire casing T resting on flange 17 of each segment 14 of drum 13. Crank 37 is rotated to cause diamond shaped member 28 to move in the direction of arrow 55 of FIG. 3. This movement of member 28 causes links 29, which are pivoted to member 28 by pins 30, to move outwardly. Since shoes 18, 19 and 20 are each attached to a link 29, shoes 18, 19 and 20 move radially outwardly, engage drum 13, and expand drum 13 into fixed engagement with the beads of the tire casing T.

Cutter drive bar 41 is positioned on shaft 11 by means of collar 42 and set screw 43 tightened so that the cutter drive bar 41 is positioned substantially as shown in FIG. 4. Collar 47 of tread cutter assembly 46 is then adjusted and secured to cutter drive bar 41 by set screw 48 in a position such that cutter 53 will cut along a line midway of the tread of casing T, as shown in FIG. 4. At this time, the cutter 53 of tread cutter assembly 46 is located as shown in dotted lines in FIG. 5. Next, collar 47 of bead cutter assembly 46 is adjusted and secured to cutter drive bar 41 by set screws 48 in a position such that cutter 53 contacts the tire casing T adjacent its upper bead. At this time, the cutter 53 of bead cutter assembly 46 is located as shown in dotted lines in FIG. 8.

Cutter holders 51 of both cutter assemblies 46 are then manually pivoted about their respective pins 49 until cutters 53 pierce the upper side wall adjacent upper bead and the tread portion of tire casing T, as shown in FIG. 4. Next shaft 11 is slowly rotated in the direction of arrow 56 of FIG. 5 by means of motor M and gear reducer G. Rotation of shaft 11 causes cutter drive bar 41, cutter assemblies 46 and cutters 53 to sweep through 360° and cut tire casing T into three circular portions having a cross section indicated as A, B and C in FIG. 4.

It should be obvious that the shape of cutter drive bar 41 can be varied and addition cutter assemblies 46 and cutters 53 attached to the cutter drive bar 41 to cut the tire casing T into a greater number of circular portions then described above. Furthermore, the diameter of drum 13 can be varied to accommodate a given size of tire casing T.

Various other changes can be made in location, size and configuration of the components of the apparatus disclosed by this invention without departing from the spirit of this invention of the scope of the following claims.

I claim:

1. Apparatus for cutting tire casings comprising:
   a. means for fixedly supporting said casing from within and about a rotatable shaft,
   b. means to rotate said shaft, and
   c. means adjustably secured to said shaft to rotate therewith and progressively cut said casing into a plurality of circular portions upon rotation of said shaft through 360°.

2. Apparatus as described in claim 1 wherein the means of subparagraph (a) includes an expandable drum in engagement with the bead of said casing, a plurality of shoes in contact with the inner surface of said drum, and means to radially and outwardly move said shoes to expand said drum.

3. Apparatus as described in claim 2 wherein said expandable drum includes a flange portion to support inner surface of a bead of said casing.

4. Apparatus as described in claim 1 wherein the means of subparagraph (c) includes an L-shaped cutter drive bar adjustably attached to said shaft and a cutter assembly adjustably attached to each leg of said L-shaped cutter drive bar.

5. Apparatus as described in claim 4 wherein each cutter assembly comprises a collar, a cutter holder pivotally attached to said collar and a cutter attached to said cutter holder.

6. Apparatus as described in claim 5 wherein the cutter of one cutter assembly cuts the tread of said casing and the cutter of the other cutter assembly cuts adjacent the bead of said casing.

7. Apparatus as described in claim 6 further including means to vary the cutting angle between the cutter of said other cutter assembly and said casing.

8. Apparatus as described in claim 3 wherein the means of subparagraph (c) includes
   an L-shaped cutter drive bar adjustably attached to said shaft,
   a cutter assembly adjustably attached to each leg of said L-shaped cutter drive bar and comprising a collar mounted on said bar,
   a cutter holder pivotally attached to said collar and a cutter attached to said cutter holder,
   the cutter of one cutter assembly cuts the tread of said casing and the cutter of the other cutter assembly cuts adjacent the bead of said casing, and
   means to vary the cutting angle between the cutter of said other cutter assembly and said casing.

* * * * *